United States Patent
Muto et al.

(10) Patent No.: US 8,514,451 B2
(45) Date of Patent: Aug. 20, 2013

(54) IMAGE PROCESSING APPARATUS AND COLOR PROCESSING METHOD

(75) Inventors: Hiroyuki Muto, Kawasaki (JP); Kazushige Hatori, Saitama (JM); Kenji Baba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/563,460

(22) Filed: Sep. 21, 2009

(65) Prior Publication Data

US 2010/0086201 A1  Apr. 8, 2010

(30) Foreign Application Priority Data

Oct. 2, 2008  (JP) ................................. 2008-257786

(51) Int. Cl.
   *H04N 1/40*  (2006.01)
(52) U.S. Cl.
   USPC ............................................. 358/2.1; 358/504
(58) Field of Classification Search
   USPC .................. 358/2.1, 1.9, 500, 504, 468, 1.16, 358/1.3, 406, 400
   See application file for complete search history.

(56) References Cited

U.S. PATENT DOCUMENTS

| | | | |
|---|---|---|---|
| 5,740,079 A | 4/1998 | Shigemori et al. | |
| 6,297,873 B1 | 10/2001 | Furuya | 355/40 |
| 2002/0180996 A1 | 12/2002 | Allen et al. | 358/1.9 |
| 2006/0196378 A1 | 9/2006 | Schuppan | 101/484 |
| 2007/0058181 A1 | 3/2007 | Hatori | |
| 2009/0225340 A1 | 9/2009 | Hatori | |

FOREIGN PATENT DOCUMENTS

| | | |
|---|---|---|
| EP | 1 267 217 | 12/2002 |
| JP | 8125792 A | 5/1996 |
| JP | 8-247932 | 9/1996 |
| JP | 8-313353 | 11/1996 |
| JP | 11289467 A | 10/1999 |
| JP | 2000-088651 | 3/2000 |
| JP | 2008168543 A | 7/2008 |
| TW | 533137 | 5/2003 |
| WO | WO 2010038881 A1 * | 4/2010 |

OTHER PUBLICATIONS

Chinese Office Action dated Jul. 28, 2011 in corresponding Chinese Application No. 200910204310.4 (with English translation).
European Search Report dated Mar. 24, 2011 in corresponding European Application No. 09171915.3-1228.
U.S. Appl. No. 12/546,228, filed Aug. 24, 2009. Applicants: Kazuhige Hatori, et al.
U.S. Appl. No. 12/505,019, filed Jul. 17, 2009. Applicant: Kenji Baba.
U.S. Appl. No. 12/546,210, filed Aug. 24, 2009. Applicants: Kazushige Hatori, et al.

* cited by examiner

*Primary Examiner* — Thomas D Lee
*Assistant Examiner* — Stephen M Brinich
(74) *Attorney, Agent, or Firm* — Fitzpatrick, Cella, Harper & Scinto (57) ABSTRACT

The colorimetric values of a plurality of reference color patches formed on a specific medium are measured at a plurality of temperatures, and a temperature characteristic LUT in a colorimetric value temperature correction unit is created based on the colorimetric values. Upon creating a calibration LUT, a patch based on arbitrary device values is formed on the medium, and a patch temperature and colorimetric values are acquired immediately after fixing of that patch. A correction target temperature as a temperature upon observation of the medium is, for example, fixed, the colorimetric values are corrected by interpolation processing based on the temperature characteristic LUT to obtain colorimetric values, and a calibration LUT is created based on the colorimetric values.

12 Claims, 11 Drawing Sheets

| DEVICE VALUE | | | | CHANGE AMOUNT PER UNIT TEMPERATURE | | |
|---|---|---|---|---|---|---|
| C | M | Y | K | ΔL | Δa | Δb |
| 0 | 0 | 0 | 10 | 0.012 | 0.001 | 0.001 |
| 0 | 0 | 0 | 20 | 0.012 | 0.001 | 0.002 |
| • | • | • | • | • | • | • |
| • | • | • | • | • | • | • |
| • | • | • | • | • | • | • |
| 80 | 40 | 20 | 10 | 0.016 | 0.03 | 0.07 |
| 80 | 40 | 20 | 20 | 0.014 | 0.03 | 0.06 |
| • | • | • | • | • | • | • |
| • | • | • | • | • | • | • |
| • | • | • | • | • | • | • |
| 100 | 100 | 100 | 100 | 0.001 | 0.001 | 0.001 |

IMAGE PROCESSING APPARATUS AND COLOR PROCESSING METHOD

BACKGROUND OF THE INVENTION

1. Field of the Invention

The present invention relates to an image processing apparatus and color processing method and, more particularly, to an image processing apparatus and color processing method which correct image data based on the colorimetric values of patches.

2. Description of the Related Art

In general, the colorimetric values of a colored object change depending on temperature, and this phenomenon is called thermochromism. Thermochromism poses a problem in a situation that requires high-precision colorimetry since it causes errors of colorimetric values according to the temperature of an object to be measured. However, many things are still unknown about the relationship between thermochromism and colorimetry.

Color stabilization and color matching processing in a general printing apparatus will be described below. Conventionally, in order to control a printing apparatus represented by a printer apparatus to output desired colors, a color conversion lookup table (to be abbreviated as LUT hereinafter) is used. The color conversion LUT includes an LUT used in calibration required to maintain a printing apparatus in a constant state, and an LUT used in color matching represented by ICC profiles. In order to create these color conversion LUTs, for example, a printing apparatus outputs a plurality of colors of patches such as patches according to IT8 standard IT8.7/3. The colors of these plurality of colors of patches are measured using a colorimeter such as a spectral colorimeter to obtain colorimetric values to associate device values with device-independent values, thus creating a color conversion LUT. The created LUT absorbs a color appearance difference between devices or that due to variations of a printer engine, thus attaining color matching and color stabilization.

Recently, using a color sensor incorporated in a printer, this LUT is generated in real time. In such a printer, the built-in color sensor detects patches immediately after fixing, and feeds back their colorimetric values for LUT generation.

However, in a general printer, since the patches immediately after fixing have high temperatures (about 70° C.), the colorimetric values of the patches change due to the thermochromism. For this reason, an LUT suited to an observation environment (room temperature) of the user cannot be precisely created.

Therefore, a technique for correcting colorimetric values in consideration of the temperature at the time of colorimetry in a printer apparatus is demanded, and the following methods have been proposed.

In one method, spectral reflectance change amounts for respective wavelengths per unit temperature interval are calculated in advance for respective coloring samples, and the spectral reflectance at a desired temperature is predicted (for example, see patent reference 1).

In another method, change amounts of absorption coefficients and scattering coefficients in the Kubelka-Munk formula for respective wavelengths per unit temperature interval are calculated for respective coloring samples, and the spectral reflectance at a desired temperature is predicted (for example, see patent reference 2).

[Patent Reference 1] Japanese Patent Laid-Open No. 08-313353.

[Patent Reference 2] Japanese Patent Laid-Open No. 08-247932.

However, in the method which is described in patent reference 1 and calculates spectral reflectance change amounts for respective wavelengths per unit temperature interval, spectral reflectances for all combinations of device values that can be output by a printing apparatus cannot be predicted.

In the method which is described in patent reference 2 and calculates change amounts of absorption coefficients and scattering coefficients for respective wavelengths per unit temperature interval for respective coloring samples, the spectral reflectance of a mixed color can be predicted according to a mixing ratio of a coloring sample. However, since a printed material that has undergone general halftoning has an uneven colored surface, it is also difficult for this method to predict spectral reflectances for all combinations of device values that can be output by a printing apparatus.

Furthermore some print media used in general printing contain a fluorescent whitening agent, which absorbs ultraviolet rays and emits fluorescence in the visible range (especially, in a blue-violet range) so as to increase the degree of whiteness. Since the fluorescent whitening effect by the fluorescent whitening agent increases/decreases depending on temperatures, the colorimetric values of printed materials output onto media including the fluorescent whitening agent also change depending on temperatures.

Since neither of the two methods described in patent references 1 and 2 consider the influence of a fluorescent whitening agent contained in substrates of coloring samples (printing media), they also cannot appropriately correct colorimetric values for printed materials using media containing the fluorescent whitening agent.

SUMMARY OF THE INVENTION

The present invention has been made to solve the aforementioned problems, and provides an image processing apparatus and color processing method, which appropriately estimate the colorimetric values of an arbitrary patch at a desired temperature with respect to a specific medium in consideration of the temperature characteristics of the medium.

The present invention in its first aspect provides an image processing apparatus comprising: a colorimetry unit configured to acquire a first colorimetric value by measuring a test patch, which has been formed on a test medium based on test patch data, when the test patch is at a first temperature; and a colorimetric value temperature correction unit configured to correct the first colorimetric value to a second colorimetric value, at a second temperature, using the test patch data and with reference to a table, wherein the table contains colorimetric value information obtained by measuring at least one reference color patch, formed on a reference medium, at a plurality of temperatures.

The present invention in its second aspect provides a printer apparatus comprising: a colorimetry unit configured to acquire a first colorimetric value by measuring a test patch, which has been formed on a test medium based on test patch data, when the test patch is at a first temperature; a transmission unit configured to transmit the first colorimetric value to a processor; a reception unit configured to receive a second colorimetric value from the processor wherein the second colorimetric value has been obtained by correcting the first colorimetric value to a second colorimetric value, at a second temperature, using the test patch data and with reference to a table, wherein the table contains colorimetric value information obtained by measuring at least one reference color patch, formed on a reference medium, at a plurality of temperatures.

The present invention in its third aspect provides a computer-readable storage medium storing colorimetric value information obtained by measuring a colorimetric value of at least one reference color patch, formed on a reference medium, when the at least one reference color patch is at a plurality of temperatures.

The present invention in its fourth aspect provides a method of generating a table for correcting a colorimetric value, the method comprising the steps of: printing at least one reference patch on a reference medium; measuring a colorimetric value of the at least one reference patch when the reference patch is at a plurality of temperatures; and generating a table based on the colorimetric values obtained in the measuring step.

Further features of the present invention will become apparent from the following description of exemplary embodiments (with reference to the attached drawings).

DESCRIPTION OF THE EMBODIMENTS

The present invention will be described in detail hereinafter by way of its preferred embodiments with reference to the accompanying drawings. Note that the arrangements described in the following embodiments are merely examples, and the present invention is not limited to the illustrated arrangements.

First Embodiment

Thermochromism

The thermochromism as a cause of correction of this embodiment will be described first. As described in the related art, there are many unknown parts about the thermochromism which changes the colorimetric values of a colored object depending on temperatures.

The present inventors investigated the relationship between the temperatures and colorimetric values using patches printed on representative media by a printer apparatus so as to resolve, in detail, the thermochromism, that is, the temperature dependence of the colorimetric values.

Figure 9:
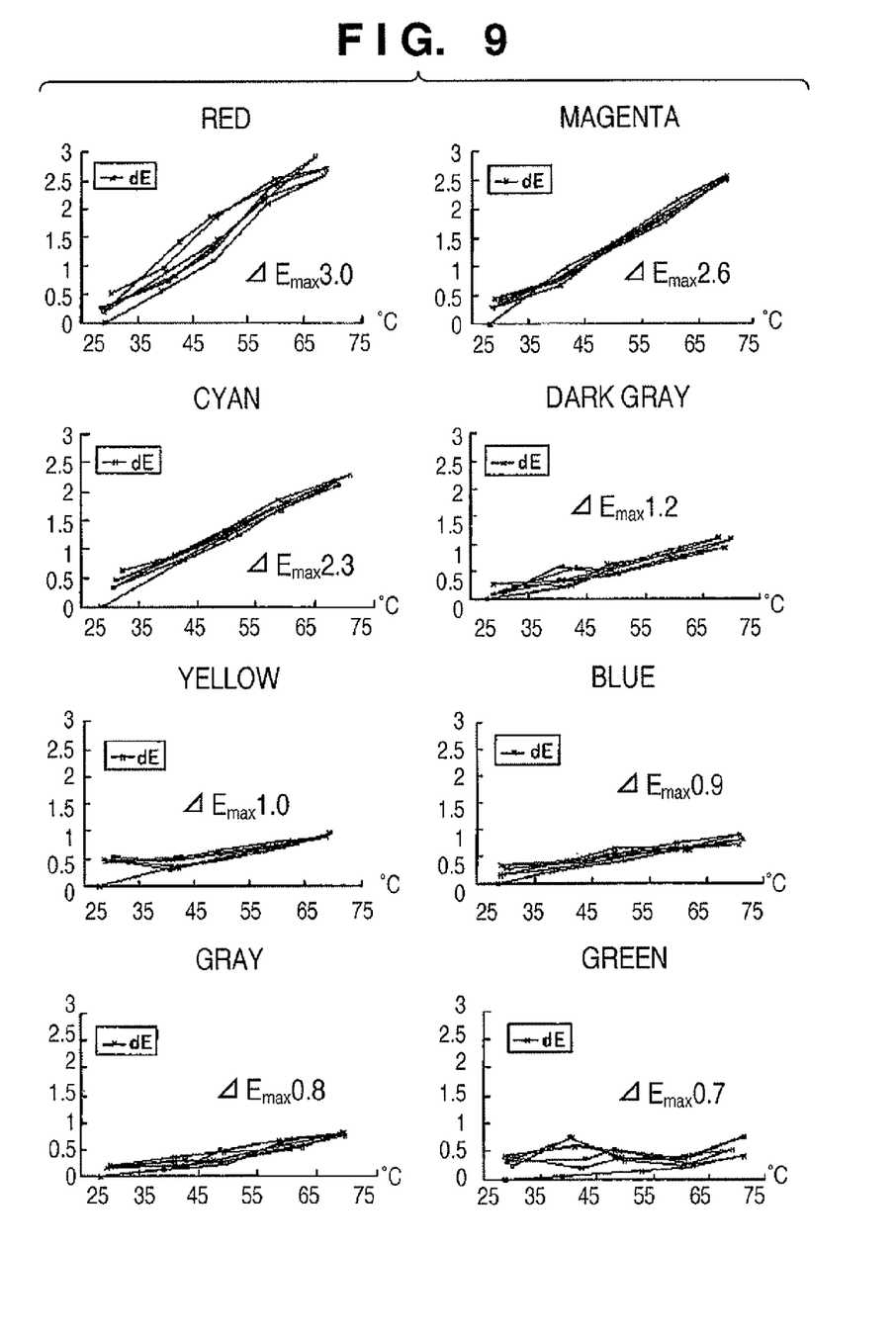
FIG. 9 includes graphs which show the thermochromism phenomena in color differences of representative patches.

FIG. 9 shows representative examples of the verification results obtained by the investigation, and shows the relationships between the colorimetric values and temperatures in association with eight colors, that is, cyan, magenta, yellow, blue, red, green, gray, and dark gray. At the time of this verification, the temperature of each patch itself was changed in increments of 10° C. and colorimetry was done without changing the temperature of a colorimeter. More specifically, after the patch temperature was raised from 30° C. to 70° C., it was lowered from 70° C. to 30° C., and this operation was repeated three times. From these verification results, when the patch temperature was changed from 30° C. to 70° C., it was confirmed that a maximum color difference $\Delta Emax$ of the colorimetric values changed within the range from 0.7 to 3. Also, it was confirmed that the color differences changed nearly linearly according to a change in temperature and those changes were reversible.

Figure 10:
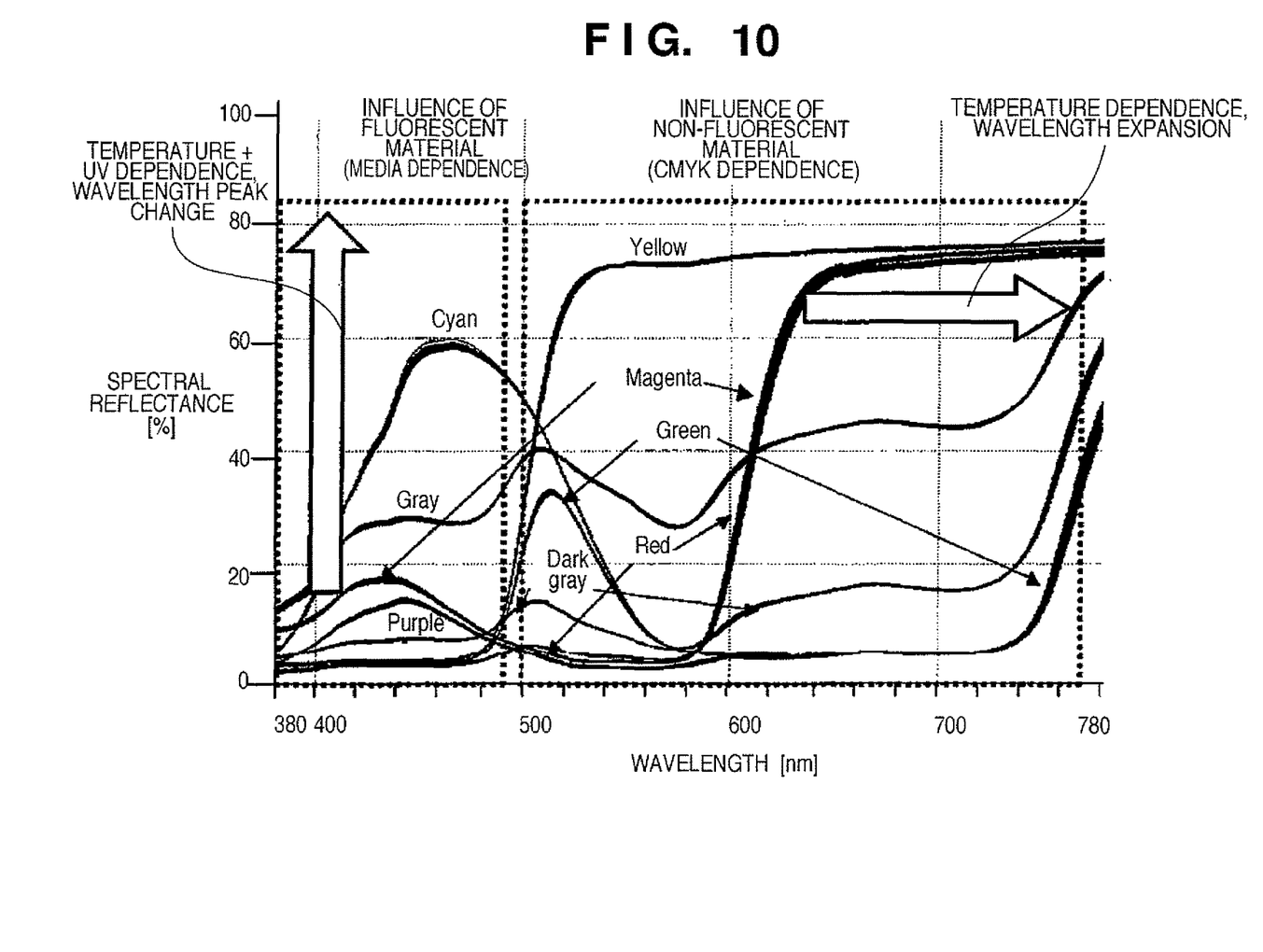
FIG. 10 is a graph showing the thermochromism phenomena in spectral reflectances of representative patches.
Figure 11:
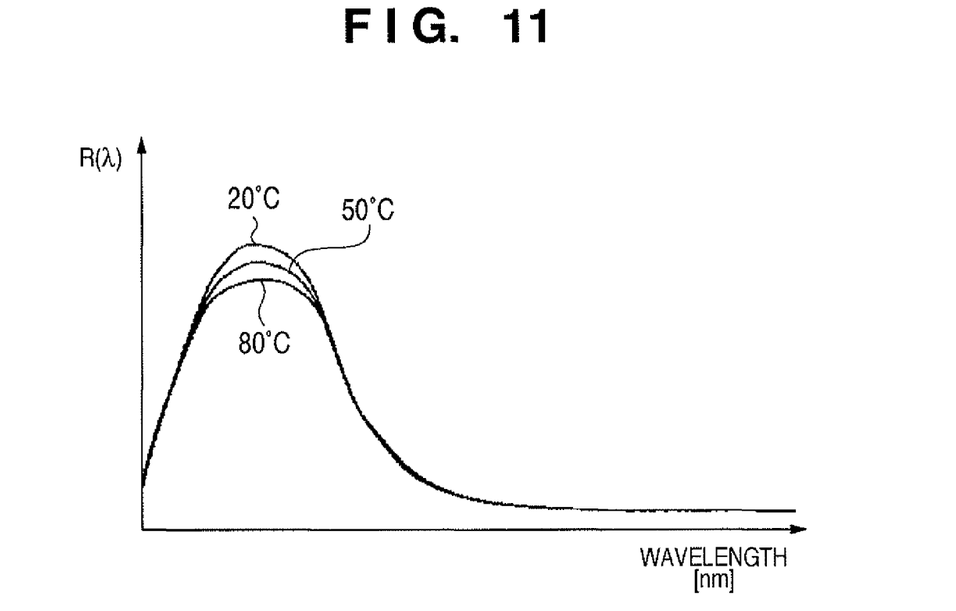
FIG. 11 is a graph showing changes in spectral reflectance due to a change in temperature of a fluorescent material.
Figure 12:
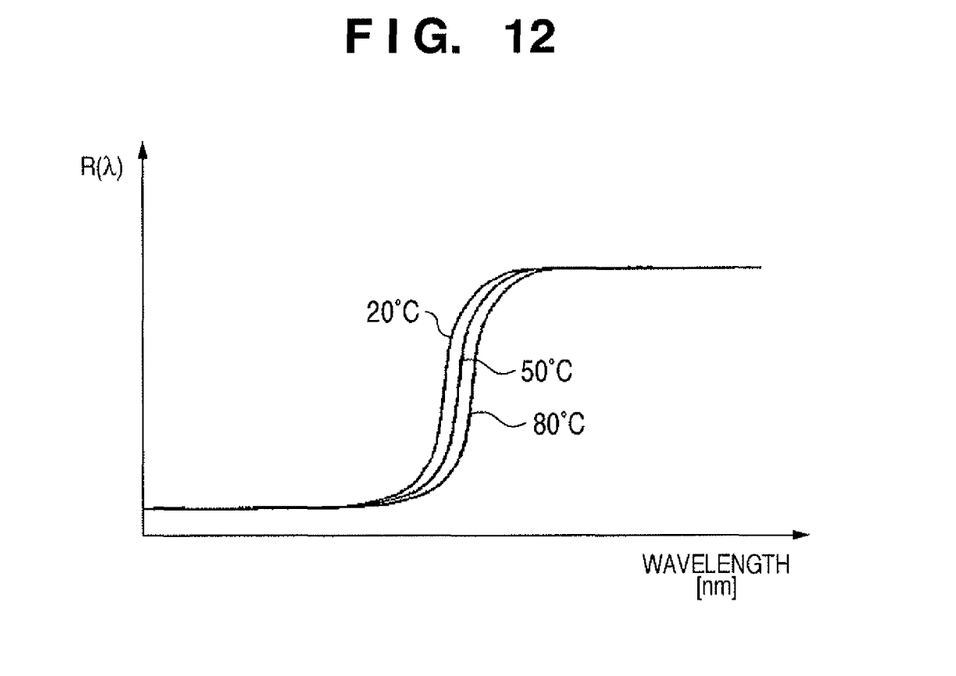
FIG. 12 is a graph showing changes in spectral reflectance due to a change in temperature of a non-fluorescent material.

Furthermore, when this phenomenon was analyzed based on the spectral reflectance, it was found that the phenomenon was classified into variations due to the influence of a fluorescent material such as a fluorescent whitening agent contained in a medium, and those due to the influence of non-fluorescent materials such as toner components, as shown in FIG. 10. As can be seen from FIG. 10, the spectral reflectance of a fluorescent material changes longitudinally (wavelength peak change) depending on temperatures, and that of non-fluorescent materials changes laterally (wavelength expansion) depending on temperatures. FIGS. 11 and 12 respectively show the wavelength peak change and wavelength expansion states extracted from FIG. 10.

Since a fluorescent material that exhibits the wavelength peak change, as shown in FIG. 11, may be contained in a medium as a fluorescent whitening agent used to increase the degree of whiteness, the colorimetric values of a printed material (toner) output onto such a medium change depending on temperatures.

In this embodiment the thermochromatic phenomena caused by such fluorescent material and non-fluorescent materials are corrected together using an LUT, and the colorimetric values of an arbitrary reproduction color of a printer at a desired temperature are appropriately estimated.

Apparatus Arrangement

This embodiment will explain colorimetric value temperature correction as a color processing method in a printer apparatus which incorporates a color sensor and in particular in an electrophotographic printer apparatus which incorporates a colorimetric sensor.

Figure 1:
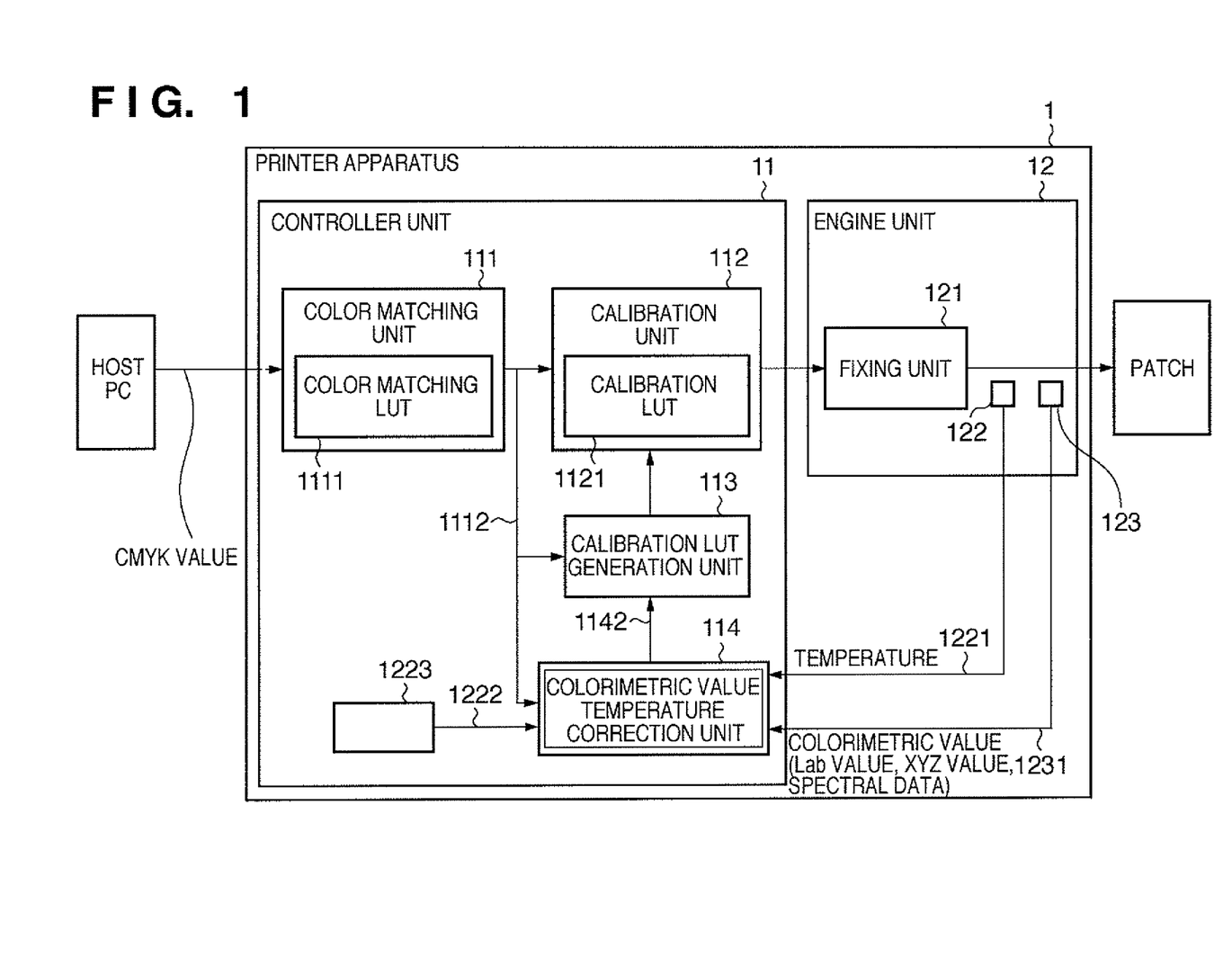
FIG. 1 is a block diagram showing the arrangement of an image processing apparatus according to an embodiment of the present invention.

FIG. 1 is a block diagram showing the arrangement of a printer apparatus according to this embodiment. A printer apparatus 1 outputs test patches for calibration before or during a print job, and measures the colorimetric values of these test patches using a built-in colorimetry sensor. Then, the apparatus 1 creates and updates a correction table based on the colorimetric values, thus maintaining constant color reproducibility of the apparatus. At this time, the plurality of output test patches for calibration have high temperatures immediately after fixing, and their colorimetric values vary by the thermochromism. Hence, this embodiment is characterized by applying correction to these colorimetric values.

Functional units of the printer apparatus 1 are roughly classified into a controller unit 11 and engine unit 12. The controller unit 11 includes a color matching unit 111, calibration unit 112, calibration LUT generation unit 113, and colorimetric value temperature correction unit 114. Note that the controller unit 11 includes various other functional units associated with image processing, but a description of the units which do not directly relate to this embodiment will not be given.

The color matching unit 111 executes color adjustment using a color matching LUT 1111 represented by an ICC profile. The calibration unit 112 executes image correction (calibration) to maintain a constant print state using a calibration LUT 1121. That is, by multi-dimensionally converting image data (device values) CMYK, whose image is to be formed and which is output from the color matching unit 111, using the calibration LUT 1121, corrected CMYK values are obtained.

Figure 2:
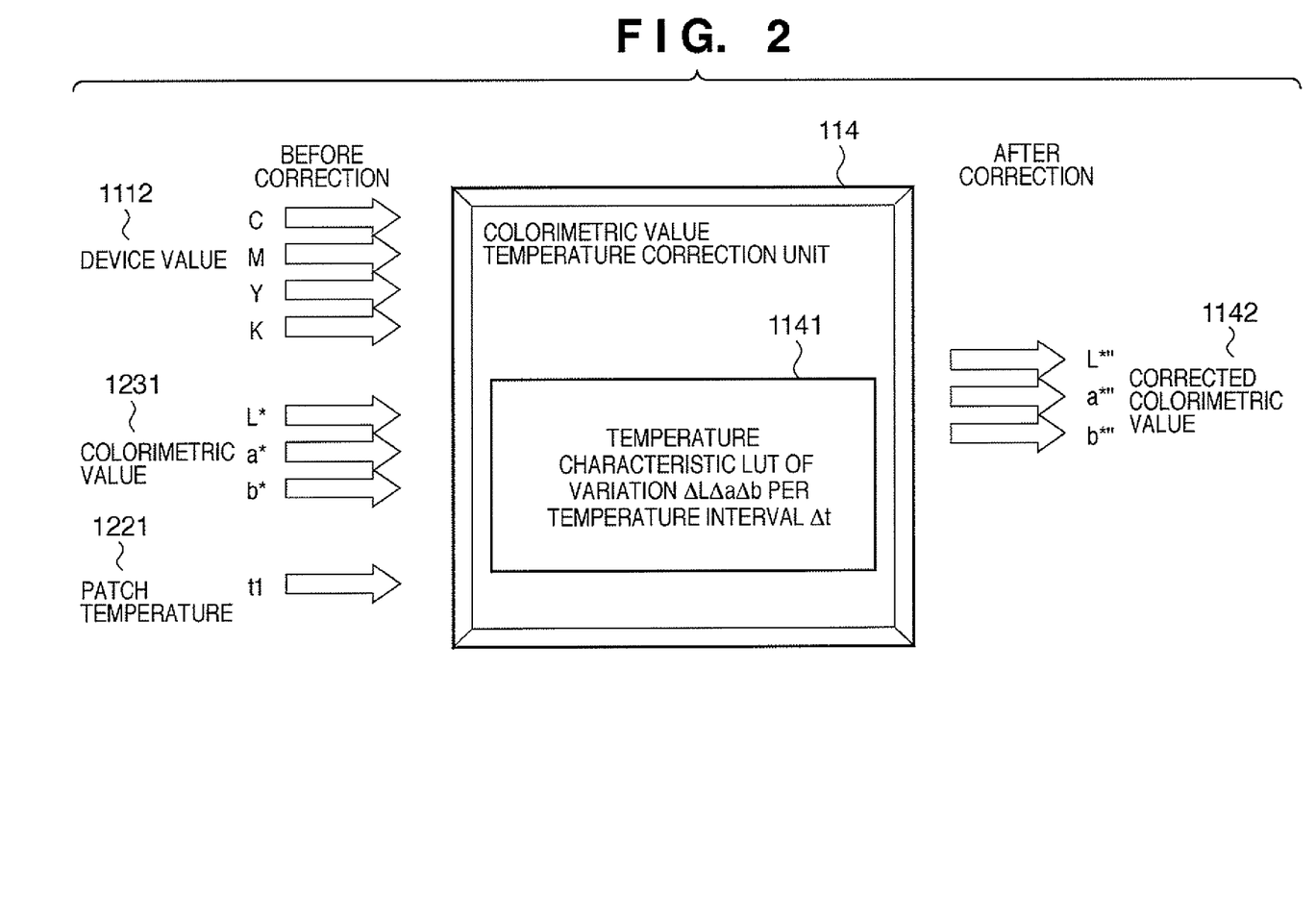
FIG. 2 is a view showing an operation overview of a colorimetric value temperature correction unit according to this embodiment.

The colorimetric value temperature correction unit 114 generates colorimetric values at a target temperature by correcting for temperature variations of test patch colorimetric values. FIG. 2 shows an operation overview in the colorimetric value temperature correction unit 114. As shown in FIG. 2, the colorimetric value temperature correction unit 114 receives test patch data (device values) 1112 from the color matching unit 111, and a patch temperature 1221 and colorimetric values 1231 as output values from a temperature sensor unit 122 and color sensor 123 in the engine unit 12 to be described later. Then, the colorimetric value temperature correction unit 114 executes temperature correction of the colorimetric values using a designated target temperature and a temperature characteristic LUT 1141 of reference patches, which is set in advance, thereby outputting corrected colorimetric values 1142.

Referring back to FIG. 1, the calibration LUT generation unit 113 generates the calibration LUT 1121 in the calibration unit 112 using the colorimetric values 1142 at the target temperature, which are corrected by the colorimetric value temperature correction unit 114.

The engine unit 12 includes a fixing unit 121, the temperature sensor unit 122, and the color sensor unit 123. Note that the engine unit 12 includes various other functional units used to form an image on a medium, but a description of the units which do not directly relate to this embodiment will not be given.

The fixing unit 121 includes a combination of rollers and a belt, incorporates a heat source such as a halogen heater, and melts and fixes toner attached on a medium by heat and pressure. The temperature sensor unit 122 and color sensor unit 123 are arranged on a convey path from the fixing unit 121 to a discharge port, and respectively measure the temperature and chromaticity value of each patch.

Temperature Characteristic LUT Creation Processing

Figure 3:
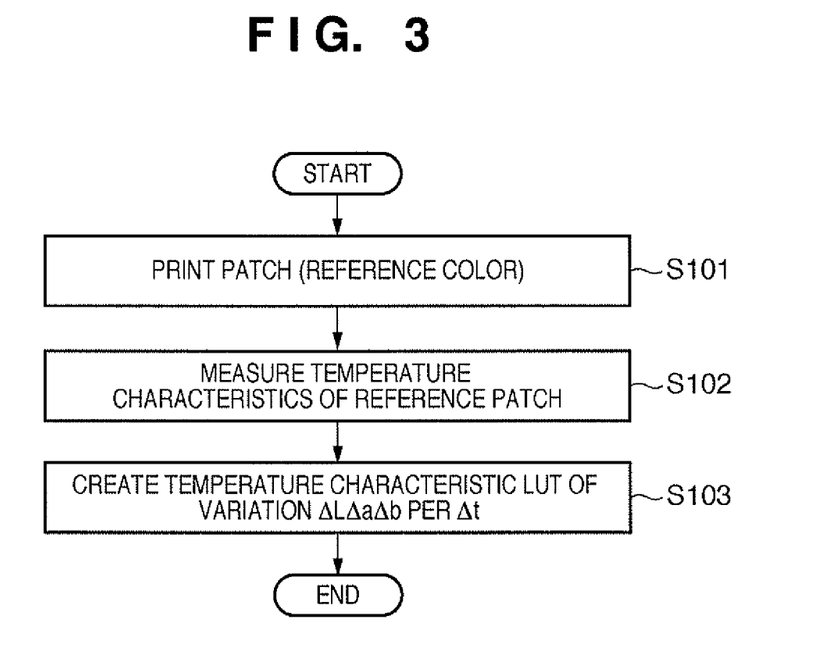
FIG. 3 is a flowchart showing creation processing of a temperature characteristic LUT according to this embodiment.

Processing for creating, in advance, the temperature characteristic LUT 1141 in the colorimetric value temperature correction unit 114, which is required for colorimetric value correction in this embodiment, will be described below with reference to the flowchart of FIG. 3.

In step S101, a medium (print paper) as a reference medium is prepared, and a target printer (the printer apparatus 1 is also used) forms and prints a plurality of patches of reference colors on the reference medium. Assume that coloring samples used in the target printer are the same as toners used in the printer apparatus 1. Patches to be printed are those of N steps for C, M, Y, and K, respectively. For example, in case of three steps per color, reference color patches of a total of $3^4$=81 colors are printed.

In step S102, the temperature of the printed reference patches is changed, and changes in colorimetric value under respective temperatures are examined using a colorimeter. More specifically, chromaticity change amounts $\Delta L^*$, $\Delta a^*$, and $\Delta b^*$ per unit temperature interval $\Delta t$ are obtained for each color as the changes in colorimetric value. The obtained values represent the temperature characteristics of each reference color. Note that the colorimeter used in this step need not always be the same device as the color sensor unit 123, but it preferably has colorimetry characteristics similar to those of the color sensor unit 123.

In step S103, the temperature characteristic LUT 1141 for the reference patches on the reference medium is created based on the obtained chromaticity change amounts (temperature characteristics) per unit temperature interval.

Figure 4:
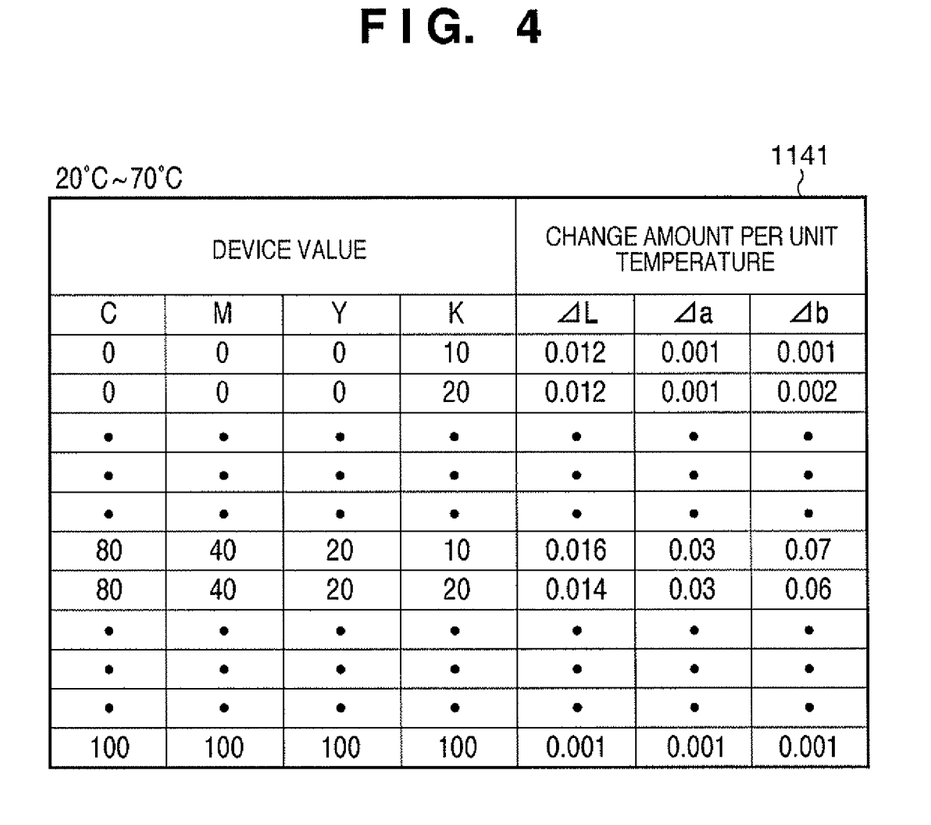
FIG. 4 is a view showing a configuration example of a temperature characteristic LUT according to this embodiment.

FIG. 4 shows an example of the temperature characteristic LUT 1141 created by the aforementioned processes. In this case, assume that changes in chromaticity values $L^*a^*b^*$ due to a change in temperature are nearly linear, as shown in FIG. 9. Note that the same printing and colorimetry processes may be applied to a plurality of reference media of different types (e.g. glossy, matte) to prepare a plurality of LUTs in correspondence with respective test media of the same type.

The temperature characteristic LUT 1141 created as described above is set in the colorimetric value temperature correction unit 114. A temperature characteristic LUT 1141 is preferably set in the colorimetric value temperature correction unit 114 in advance. Alternatively or in addition a temperature characteristic LUT may be created in the colorimetric value temperature correction unit 114 based on information provided to the colorimetric value temperature correction unit where the information provided has been obtained by measuring a plurality of reference color patches, formed on a reference medium, when the plurality of reference color patches are at a plurality of temperatures. The information is preferably provided by a carrier medium. Examples of a suitable carrier medium include a transmission medium, such as a signal, sent via a network or a storage medium such as a memory device. Thus the information may be downloaded from a website via the internet to the printer apparatus or may be provided in the form of a memory device such as a CD. The information may be provided as a look up table or in the form of data suitable for generating a look up table. If provided in the form of data suitable for generating a look up table, instructions for generating a look up table may also be provided.

Calibration LUT Creation Processing

In this embodiment, patch colorimetric values measured by the color sensor unit 123 are corrected using the temperature characteristic LUT 1141, which is created as described above, and the calibration LUT 1121 is created based on the corrected colorimetric values. Generation processing of the calibration LUT 1121 in the printer apparatus 1 of this embodiment will be described below with reference to the flowchart of FIG. 5.

Figure 5:
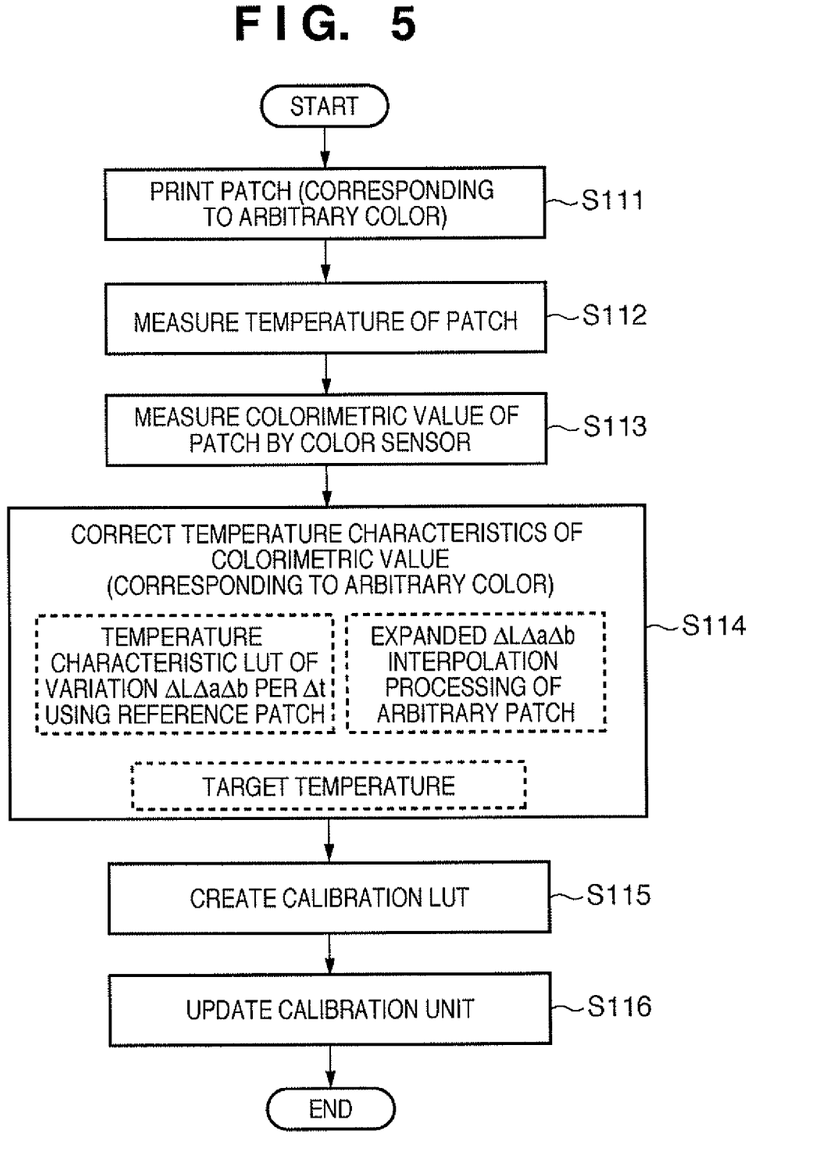
FIG. 5 is a flowchart showing colorimetric value correction processing according to this embodiment.

In step S111, the printer apparatus 1 prints patches on a test medium. Note that patches to be printed can correspond to patch data of arbitrary colors, and patches for an intended purpose may be printed.

In steps S112 and S113, in the engine unit 12, the temperature sensor unit 122 measures the temperature of each patch immediately after it has passed the fixing unit 121, and the color sensor unit 123 measures its chromaticity values. The temperature acquired in step S112 will be referred to as a first temperature, and the colorimetric values acquired in step S113 will be referred to as first colorimetric values hereinafter.

In step S114, the colorimetric value temperature correction unit 114 receives first colorimetric values 1231, a patch temperature (first temperature) 1221, and device values (patch data) CMYK 1112 used to print the corresponding patch, and corrects the colorimetric values. Assume that a target temperature (second temperature) representing a temperature (° C.) state to which the colorimetric values are to be corrected is designated in advance, and is written in the colorimetric value temperature correction unit 114. As the second temperature, a temperature upon actually observing an image formed on that medium is preferably set. For example, it may be appropriate to set the second temperature as 23° C. (JIS Z8703) which is the standard temperature in the colorimetry field.

The colorimetric value correction operation in the colorimetric value temperature correction unit 114 will be described in detail below with reference to FIG. 2. As described above, the colorimetric value temperature correction unit 114 holds, in advance, the temperature characteristic LUT 1141 that stores chromaticity change amounts $\Delta L^*$, $\Delta a^*$, and $\Delta b^*$ per unit temperature interval $\Delta t$ of the reference patches. The colorimetric value temperature correction unit 114 estimates chromaticity change amounts $\Delta L^{*\prime}$, $\Delta a^{*\prime}$, and $\Delta b^{*\prime}$ per unit temperature interval $\Delta t$ of the currently printed patch using interpolation operations based on the temperature characteristic LUT 1141 and the input device values CMYK 1112. As the interpolation operations, for example, CMYK four-dimensional linear interpolation is used.

Then, the colorimetric value temperature correction unit 114 generates colorimetric values (second colorimetric values) $L^{*\prime\prime}$, $a^{*\prime\prime}$, and $b^{*\prime\prime}$ 1142 at the desired target temperature (second temperature) based on the calculated chromaticity change amounts $\Delta L^{*\prime}$, $\Delta a^{*\prime}$, and $\Delta b^{*\prime}$ per unit temperature interval $\Delta t$. This generation process is done using a first temperature t1, a second temperature t2, and the first colorimetric values $L^*$, $a^*$, and $b^*$ 1231 based on:

$$L^{*\prime\prime}=L^*+(t2-t1)\Delta L^{*\prime}$$

$$a^{*\prime\prime}=a^*+(t2-t1)\Delta a^{*\prime}$$

$$b^{*\prime\prime}=b^*+(t2-t1)\Delta b^{*\prime} \quad (1)$$

Next, the calibration LUT generation unit 113 creates a new calibration LUT 1121 based on the second colorimetric values 1142 in step S115, and updates the calibration unit 112 in step S116.

As described above, according to this embodiment, the first colorimetric values under the first temperature on the test medium are corrected to the second colorimetric values under the second temperature with reference to the temperature characteristic LUT 1141. This temperature characteristic LUT 1141 reflects the temperature characteristics based on the actually measured values of the reference patches on a reference medium. The reference medium is preferably of the same type as the test medium and more preferably is as close as possible to the test medium. Therefore, the thermochromism caused by a fluorescent material (fluorescent whitening agent) contained in the medium and that caused by non-fluorescent materials (toner components) can be corrected together.

In this way, since the colorimetric values of an arbitrary reproduction color of a printer at a desired temperature can be appropriately estimated in consideration of the temperature characteristics of a medium, a calibration LUT which does not depend on the patch temperature immediately after fixing can be generated. Therefore, the reproduction colors of the printer apparatus can be stabilized.

In this embodiment, the colorimetric value correction of patches used to create the calibration LUT is executed. Also, the colorimetric value correction of patches used to create a color profile LUT can be executed in the same sequence.

Note that this embodiment has exemplified the colorimetric value correction in the electrophotographic printer apparatus 1. However, the present invention is also applicable to printing apparatuses of other systems.

<Modifications>

Figure 6:
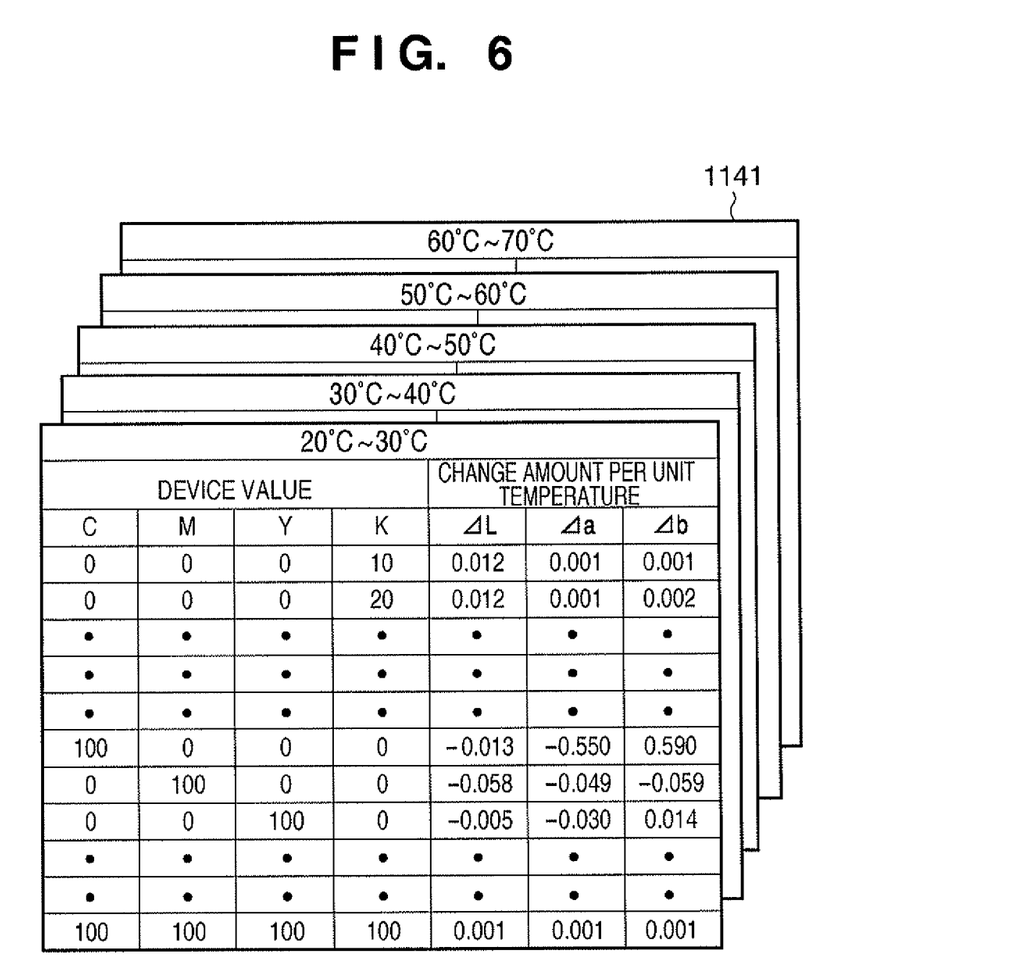
FIG. 6 is a view showing a configuration example of temperature characteristic LUTs according to a modification.

As described above, in this embodiment, a temperature correction LUT holds the change amounts $L^*$, $a^*$, and $b^*$ per unit temperature interval $\Delta t$ common to all temperatures. For example, change amounts $\Delta L^*$, $\Delta a^*$, and $\Delta b^*$ are commonly held within the range from 20° C. to 70° C. However, the change amounts of colorimetric values do not always change linearly at every temperature. In this manner, when the change amounts of colorimetric values are not linear, that is, when they may change nonlinearly, it is effective to prepare temperature characteristic LUTs for respective temperature zones, so as to improve the precision. FIG. 6 shows an example in which temperature characteristic LUTs are prepared in correspondence with 10° zones like a zone from 20° C. to 30° C., that from 30° C. to 40° C., and so forth. In this way, by preparing a plurality of temperature characteristic LUTs, the correction precision can be improved even for nonlinear changes, and more flexible control can be implemented.

Figure 7:
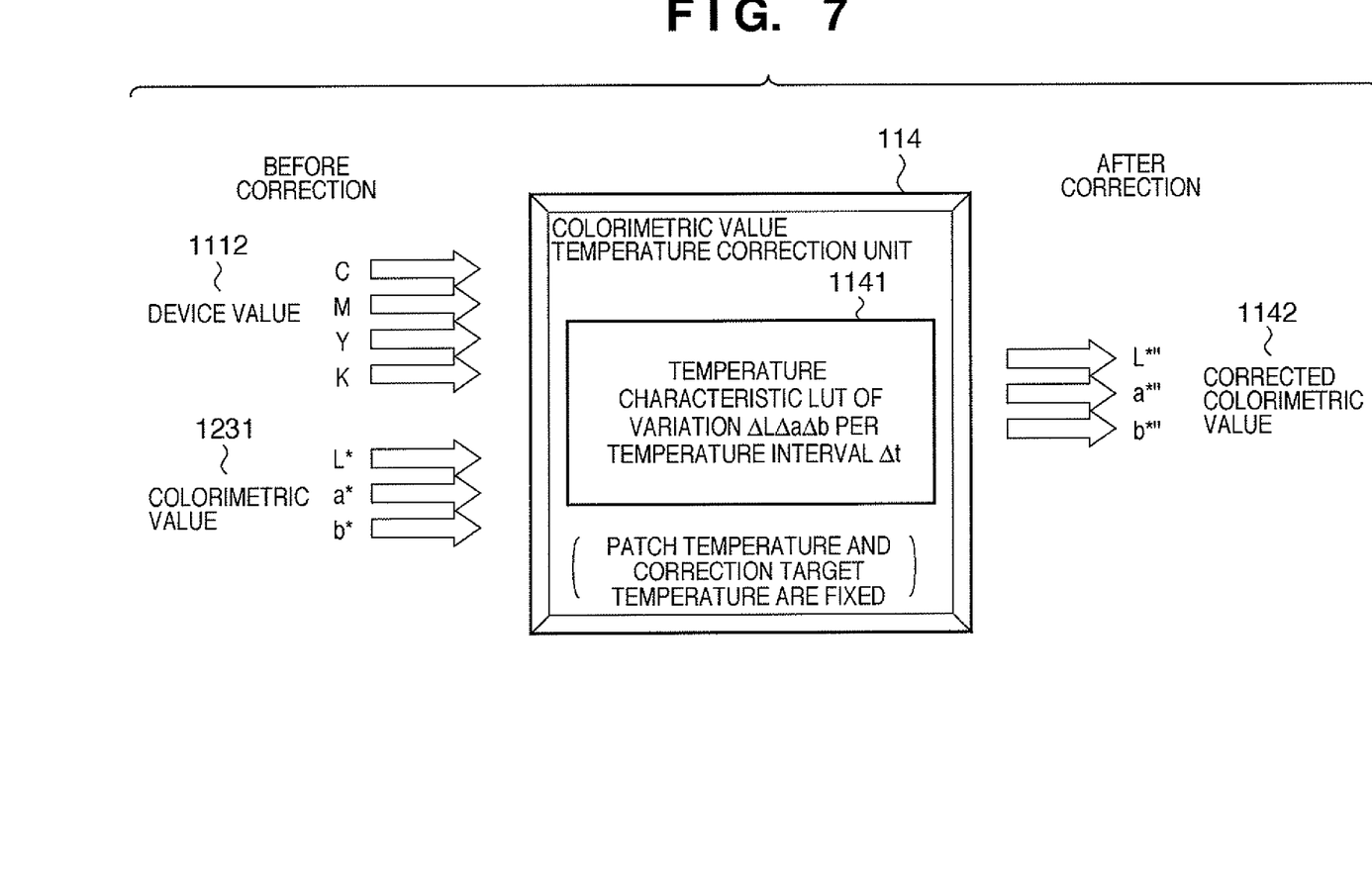
FIG. 7 is a view showing an operation overview of the colorimetric value temperature correction unit according to a modification.

In the arrangement of this embodiment, the patch temperature (first temperature) 1221 measured by the temperature sensor unit 122 is input to the colorimetric value temperature correction unit 114 to execute temperature correction of colorimetric values. However, when the first temperature is always constant, for example, when the patch temperature immediately after fixing is expected to be constant, the first temperature need not be input at the time of colorimetric value correction. That is, as shown in FIG. 7, the temperature characteristic LUT 1141 may be created under the assumption that the first temperature (patch temperature) is fixed. In this way, the need for the patch temperature 1221 input to the colorimetric value temperature correction unit 114 in FIG. 2 can be obviated, thus realizing a simpler arrangement. In this case, the temperature sensor unit 122 itself in the engine unit 12 can also be omitted.

Figure 8:
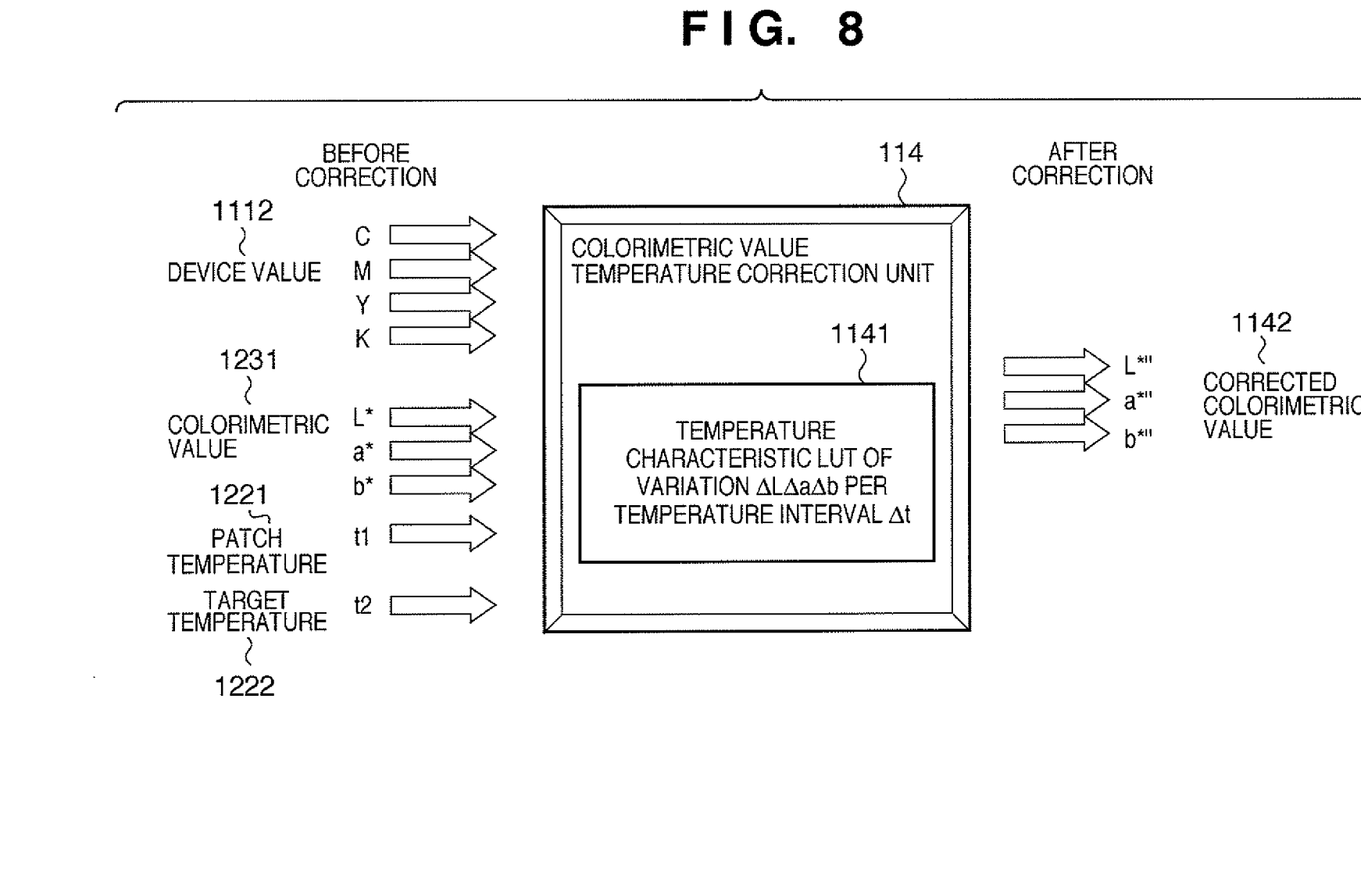
FIG. 8 is a view showing an operation overview of the colorimetric value temperature correction unit according to a modification.

In this embodiment, the second temperature as a correction target temperature has been presumed to be fixed, and the first temperature 1221 is input to execute the temperature correction of colorimetric values. However, as shown in FIG. 1 a second temperature acquisition means 1223 may be present to acquire a second temperature (correction target temperature) 1222. The second temperature acquisition means provides the second temperature 1222 to the colorimetric value temperature correction unit 114, as illustrated in FIG. 8, as needed. That is, the printing apparatus may include both an arrangement used to acquire the first temperature, and that used to acquire the second temperature. The second temperature may be acquired by the second temperature acquisition means based on an instruction input by an external user operation or a signal input from a sensor which automatically measures the room temperature in a printer setting environment.

In the example described in this embodiment, the chromaticity change amounts $\Delta L^*$, $\Delta a^*$, and $\Delta b^*$ per unit temperature interval $\Delta t$ are stored in the temperature characteristic LUT. In place of the chromaticity change amounts, a spectral reflectance change amount $\Delta R(\lambda)$ per unit temperature interval $\Delta t$ may be stored. That is, correction can also be executed based on a spectral reflectance $R(\lambda)$ of a patch measured by the color sensor unit 123. As the temperature characteristic LUT, other tristimulus values XYZ or change amounts of other color space values may be used.

As the temperature characteristic LUT, actually measured data at respective temperatures, for example, Lab values, spectral reflectances, and tristimulus values XYZ may be stored in place of difference data such as the chromaticity change amounts per unit temperature interval, and the corrected values may be calculated based on the actually measured data.

In the first embodiment the printer apparatus comprises the colorimetric value correction unit. However, the invention may also be embodied as an image processing apparatus comprising a computer, such as the host PC of FIG. 1, and a printer apparatus substantially as described in the first embodiment, except that the colorimetric value temperature correction unit (or means) 114 is comprised within the computer rather than in the printer apparatus. The computer is thus arranged to receive a first colorimetric value from the printer apparatus, to correct the first colorimetric value to a second colorimetric value, as performed in the colorimetric value temperature correction unit or means described with reference to the first embodiment, and to transmit the second colorimetric value to the printer apparatus. The calibration LUT generation unit or means 113 may also be comprised in the computer in which case the computer will transmit the newly generated calibration LUT to the printer apparatus. The printer apparatus thus comprises a transmission means for transmitting the first colorimetric value to the computer and a reception means for receiving the second colorimetric value from the computer and/or the newly generated calibration LUT from the computer. The test patch data from which the test patch is formed may be transmitted to the computer with the first colorimetric value or may be already stored in the computer if the computer has been used to transmit the image data to the printer apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a carrier medium such as a transmission medium (signal) from e.g. a network or via a carrier medium in the form of a recording medium of various types serving as a memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-257786, filed Oct. 2, 2008, which is hereby incorporated by reference herein in its entirety.

What is claimed is:

1. An image processing apparatus comprising:
   a storage unit configured to store a table containing a correspondence between a reference color value and a change amount of the reference color value according to a temperature;
   a colorimetry unit configured to acquire a first colorimetric value by measuring a test patch, which has been formed on a test medium based on test patch data; and
   a temperature acquiring unit configured to acquire a first temperature at which the test patch is measured;
   an interpolation unit configured to interpolate the table with the first colorimetric value and a corresponding change amount to estimate the change amount corresponding to the acquired first colorimetric value; and
   a colorimetric value temperature correction unit configured to correct the first colorimetric value to obtain a second colorimetric value, at a second temperature, using the change amount estimated by said interpolation unit.

2. The apparatus according to claim 1, wherein the table contains the correspondence between the reference color value and the change amount of the reference color value in a colorimetric value per unit temperature interval for each of the at least one reference color patches.

3. The apparatus according to claim 1, wherein the table has information of a change amount of a colorimetric value per unit temperature interval for each of a plurality of temperature zones.

4. The apparatus according to claim 1, wherein the table has information of a change amount of a spectral reflectance per unit temperature interval for each of the at least one reference color patches.

5. The apparatus according to claim 1, further comprising a first temperature acquisition unit configured to acquire, as the first temperature, a temperature of the test patch immediately after the test patch is formed on the test medium.

6. The apparatus according to claim 5, further comprising a second temperature acquisition unit configured to acquire the second temperature.

7. The apparatus according to claim 1, further comprising an image correction unit configured to correct image data, whose image is to be formed, based on the second colorimetric value.

8. The apparatus according to claim 7, wherein said image correction unit creates a correction table based on the second colorimetric value, and corrects the image data based on the correction table.

9. The apparatus according to claim 1, wherein the table is selected from a plurality of tables, wherein the information contained in each table relates to a different reference medium.

10. A color processing method comprising:
    a colorimetry step of acquiring a first colorimetric value by measuring a test patch, which is formed on a test medium based on test patch data;
    a temperature acquiring step of acquiring a first temperature at which the test patch is measured;
    an interpolation step of interpolating a table with the first colorimetric value and a corresponding change amount to estimate a change amount corresponding to the acquired first colorimetric value, wherein the table is stored and contains a correspondence between a reference color value and a change amount of the reference color value according to a temperature; and
    a colorimetric value temperature correction step of correcting the first colorimetric value to obtain a second colorimetric value at a second temperature, using the change amount estimated in the interpolation step, wherein at least one of the interpolation step and the colorimetric value temperature correction step is performed using one or more processors.

11. The method according to claim 10, wherein the table contains the correspondence between the reference color value and the change amount of the reference color value of a colorimetric value per unit temperature interval for each of the at least one reference color patches.

12. A non-transitory computer-readable storage medium storing a program which when run on a computer in an image processing apparatus causes the image processing apparatus to:
   store a table containing a correspondence between a reference color value and a change amount of the reference color value according to a temperature;
   acquire a first colorimetric value by measuring a test patch, which is formed on a test medium based on test patch data;
   acquire a first temperature at which the test patch is measured;
   interpolate the table with the first colorimetric value and a corresponding change amount to estimate the change amount corresponding to the acquired first colorimetric value; and
   correct the first colorimetric value to obtain a second colorimetric value at a second temperature using the change amount estimated by the interpolation.

* * * * *